March 6, 1951 F. SAYERS 2,544,186
PRESSURE REGULATOR
Filed Nov. 22, 1946
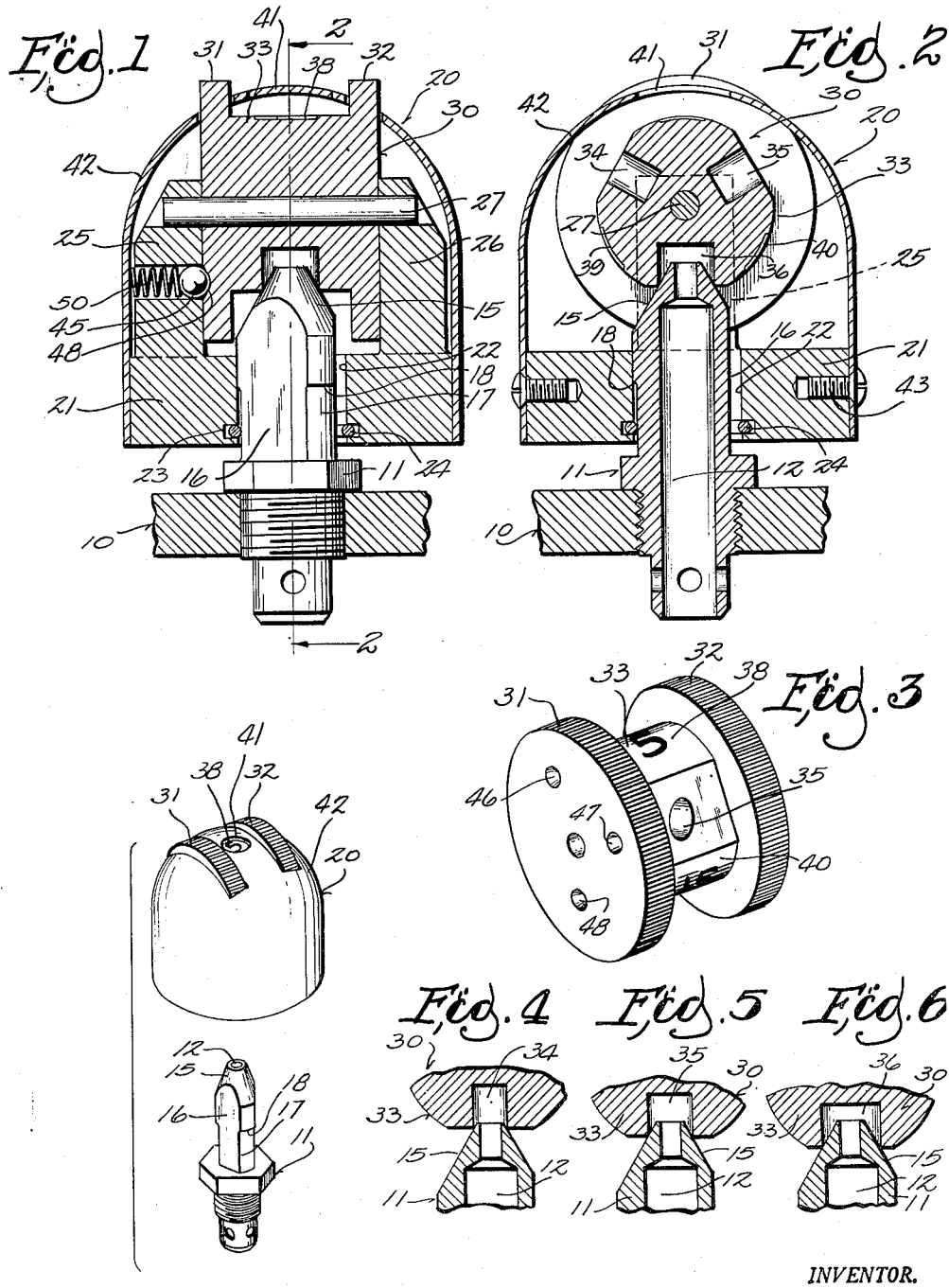
INVENTOR.
FREDERICK SAYERS
BY
Wheeler, Wheeler & Wheeler
ATTORNEYS Patented Mar. 6, 1951

2,544,186

UNITED STATES PATENT OFFICE 2,544,186

PRESSURE REGULATOR

Frederick Sayers, Fort Atkinson, Wis., assignor to Moe Brothers Manufacturing Company, Fort Atkinson, Wis., a corporation of Wisconsin Application November 22, 1946, Serial No. 711,528

3 Claims. (Cl. 137—53)

This invention relates to improvements in pressure regulators.

It is a primary object of the invention to provide simple and effective means for the adjustable regulation of pressures at predetermined values. The device has particular utility in connection with the adjustable regulation of pressures in pressure cookers and the like.

More specifically stated, it is my purpose to provide a pressure regulator in which a rotor adjustable to selected positions presents apertures of different sizes to a conically tapered vent, the size of the aperture determining the area exposed to pressure issuing through the vent and hence determining the pressure at which the fixed weight of the regulating apparatus will be lifted to release excess pressure beyond that for which the device is set. Instead of varying the weight with which the valve is loaded, I vary the area exposed to pressure.

Other objects of the invention relate to the provision of simple means which is releasably attached to the vent of a pressure cooker and may, without detaching, be adjusted with regard to the pressure maintained. It is my further purpose to provide a novel organization in which visible indication of the pressure for which the device is set is displayed through an aperture in the housing of the regulator. Still other objects will be apparent from the following disclosure of the invention.

In the drawings:

Fig. 1 is a view in axial section through a regulator embodying the invention.

Fig. 2 is a view in axial section taken at right angles to the plan of Fig. 1 on the line 2—2 of Fig. 1.

Fig. 3 is a view in perspective of the rotor by which regulation is achieved.

Figs. 4, 5 and 6 are fragmentary detail views in sections, showing the manner in which the various sizes of sockets in the rotor engaged with the tapered nozzle through which excess pressure escapes.

Fig. 7 is a view on a reduced scale showing the regulating appliance and the co-acting nozzle as they appear when slightly separated.

The top wall or cover of any kind of a pressure vessel in which regulation is to be achieved is represented at 10. Into this is threaded a nozzle fitting 11 through which extends a steam vent 12. The nozzle fitting is conically tapered at 15 at its upper end. It may have flattened faces at 16, and it is desirably undercut at 17 to provide a shoulder at 18.

The regulating appliance generically designated by reference character 20 comprises a body portion 21 of considerable mass, having an opening at 22 to receive that portion of nozzle 11 which projects above the wall 10. In the opening 22 is a channel 23, within which I provide an expansible ring 24, serving as a key, resiliently contractile about the reduced portion 17 of the nozzle, and engageable with the shoulder 18 thereof to limit accidental displacement of the regulator appliance 20 from the nozzle. Assuming the wall 10 to be a part of the cover of a pressure cooker, this arrangement permits the cover to be handled freely without danger that the regulator may fall therefrom. Yet, under a slight degree of upward tension, the contractile key or ring 24 will expand to clear the shoulder 18, thus permitting the regulator appliance to be withdrawn bodily, as shown in Fig. 7.

A pair of upstanding ears 25, 26 on the body 21 support a pintle 27 upon which the rotor 30 is rotatably mounted. The rotor 30 preferably comprises a pair of milled disks 31, 32 and an intervening valve section 33, the whole having the shape of a spool. At three angularly-spaced points, the valve portion 33 of the rotor is provided with sockets 34, 35 and 36 of progressively increasing diameter. Opposite each socket on the periphery of the valve section 33 is a number representing the number of pounds of pressure which would be maintained in the vessel when the socket opposite such number is engaged with the conically-tapered end 15 of the nozzle. As illustrated, the relative dimensions of the parts, with respect to the weight of the regulating appliance, is so determined that, with the larger socket 36 engaged with the end of the nozzle, the cross-sectional area of the nozzle at the line of engagement will withstand a pressure of five pounds to the square inch in the receptacle. Accordingly, the number 5 appears on the valve portion 33 of the rotor at a point 38 which is directly opposite socket 36. Similarly, the numeral 10 (not shown) appears at the point 39 (Fig. 2) opposite socket 35, and the numeral 15 appears at the point 40 (Fig. 2 and Fig. 3) opposite the smallest socket 34. When the respective sockets are positioned for engagement with the tapered end of the nozzle, the corresponding numerals representing the pressure in pounds are shown through the window 41 in the housing 42 which surrounds the rotor and is fastened by screws 43 to the body of the device. Figs. 4, 5 and 6 show how the effective pressure is varied. The smallest socket 34 affords a limited area upon which the pressure acts, the socket seating close to the small end of the tapered nozzle. The larger socket 35 seats farther down on the nozzle, thereby affording increased area upon which the pressure may act, while the largest socket affords still greater area by seating further down on the tapered wall 15.

As will be apparent from Fig. 1, the contractile key 24 is normally a substantial distance below shoulder 18, thus allowing a certain amount of lost motion between the nozzle and the regulating appliance 20. If the appliance be lifted somewhat on the nozzle, within the limits afforded by the length of the reduced section 17, the socket engaged with the nozzle will clear the upper end thereof, and thereupon the knurled or milled disks 31, 32, projecting through slots in the housing 42, may be manipulated to rotate the valve member 30 to bring a different socket into registration with the nozzle. In any given position of the rotor 30 in which one of its sockets is engaged with the nozzle, I preferably employ a ball detent 45 to hold the rotor in the selected position of adjustment. The ball may conveniently be acted upon by a compression spring 50 which is confined between the ball and the housing shell 42 to urge the ball yieldably into one of the several openings 46, 47, 48 in one of the disks of the rotor.

The entire regulating appliance 20 acts like a poppet valve biased by its own weight to resist the pressure communicated through the valve tube 12 of nozzle 11. As in the case of any poppet valve, an excess of pressure above a predetermined value will open the valve to further the excess. When the pressure exceeds the value for which the rotor is set, the pressure will act on the area determined by the particular socket engaged with the tapered end of the nozzle and will cause the entire appliance 20 to lift sufficiently so that the steam can escape downwardly from the socket and around the flattened faces 16 of the nozzle.

I claim:

1. In combination, a nozzle applicable to the wall of a pressure vessel and having a vent orifice and an externally tapered conical tip, said nozzle having a relieved portion below said tip forming a shoulder at the boundary of said relieved portion, a removable regulating appliance resting by gravity on said nozzle and comprising an annular body surrounding the nozzle and free for limited reciprocation along the relieved portion of the nozzle, said body having a channel opposite the relieved portion of the nozzle, a contractile resilient key in the channel in engagement with the relieved portion of the nozzle and adapted yieldably to limit reciprocation of said body by engagement of said key with said shoulder, a pair of spaced ears upstanding from said annular base, a spool-shaped rotor between said ears, a pintle supported by said ears and upon which said rotor is rotatable, said rotor comprising spaced disk portions and an intervening valve portion provided at angularly spaced points with differentially diametered sockets for cooperation with said tapered nozzle tip.

2. In combination, a nozzle applicable to the wall of a pressure vessel and having a vent orifice and an externally tapered conical tip, said nozzle having a relieved portion below said tip forming a shoulder at the boundary of said relieved portion, a removable regulating appliance resting by gravity on said nozzle and comprising an annular body surrounding the nozzle and free for limited reciprocation along the relieved portion of the nozzle, said body having a channel opposite the relieved portion of the nozzle, a contractile resilient key in the channel in engagement with the relieved portion of the nozzle and adapted yieldably to limit reciprocation of said body by engagement of said key with said shoulder, a pair of spaced ears upstanding from said annular base, a spool-shaped rotor between said ears, a pintle supported by said ears and upon which said rotor is rotatable, said rotor comprising spaced disk portions and an intervening valve portion provided at angularly spaced points with differentially diametered sockets, a shell enclosing said rotor and provided with openings through which the disk portions thereof project for manipulation, said shell having a window between said openings, indicating means on said rotor registering with the window when a given socket registers with said nozzle.

3. In combination, a nozzle applicable to the wall of a pressure vessel and having a vent orifice and an externally tapered conical tip, said nozzle having a relieved portion below said tip forming a shoulder at the boundary of said relieved portion, a removable regulating appliance resting by gravity on said nozzle and comprising an annular body surrounding the nozzle and free for limited reciprocation along the relieved portion of the nozzle, said body having a channel opposite the relieved portion of the nozzle, a contractile resilient key in the channel in engagement with the relieved portion of the nozzle and adapted yieldably to limit reciprocation of said body by engagement of said key with said shoulder, a pair of spaced ears upstanding from said annular base, a spool-shaped rotor between said ears, a pintle supported by said ears and upon which said rotor is rotatable, said rotor comprising spaced disk portions and an intervening valve portion provided at angularly spaced points with differentially diametered sockets, a shell enclosing said rotor and provided with openings through which the disk portions thereof project for manipulation, said shell having a window between said openings, indicating means on said rotor registering with the window when a given socket registers with said nozzle, and means for selectively and yieldably defining positions of such registry, said means comprising a ball detent mounted in one of said ears and a spring bearing on the ball detent and confined by said housing, said rotor having in its end face recesses with which said ball is selectively engaged.

FREDERICK SAYERS.

REFERENCES CITED

The following references are of record in the file of this patent:

UNITED STATES PATENTS

| Number | Name | Date |
| --- | --- | --- |
| 191,663 | Ellis | June 5, 1877 |
| 821,624 | Edison | May 29, 1906 |
| 858,131 | Aichele | June 25, 1907 |
| 1,302,443 | Shwab | Apr. 29, 1919 |
| 1,370,988 | Myers | Mar. 8, 1921 |
| 1,486,162 | Shaffer | Mar. 11, 1924 |
| 2,422,237 | Hansen | June 17, 1947 |
| 2,428,483 | Wittenberg | Oct. 7, 1947 |
| 2,485,380 | Hansen | Oct. 18, 1949 |

FOREIGN PATENTS

| Number | Country | Date |
| --- | --- | --- |
| 243,569 | Switzerland | of 1945 |